United States Patent
Chu et al.

(10) Patent No.: US 7,318,118 B2
(45) Date of Patent: Jan. 8, 2008

(54) SYSTEM AND METHOD FOR SELECTIVE WRITE TO FLASH MEMORY IN HDD

(75) Inventors: Frank Rui-Feng Chu, Milpitas, CA (US); Richard M. H. New, San Jose, CA (US); Spencer W. Ng, San Jose, CA (US)

(73) Assignee: Hitachi Global Storage Technologies B.V., Amsterdam (NL)

( * ) Notice: Subject to any disclaimer, the term of this patent is extended or adjusted under 35 U.S.C. 154(b) by 337 days.

(21) Appl. No.: 11/181,103

(22) Filed: Jul. 14, 2005

(65) Prior Publication Data

US 2007/0016725 A1    Jan. 18, 2007

(51) Int. Cl.
    *G06F 12/00*    (2006.01)
(52) U.S. Cl. .................. 711/103; 711/113; 711/138
(58) Field of Classification Search ........... 711/103, 711/111, 112, 113, 114, 138
    See application file for complete search history.

(56) References Cited

U.S. PATENT DOCUMENTS

| 5,584,007 | A | 12/1996 | Ballard ................ 395/440 |
| 6,295,577 | B1 | 9/2001 | Anderson et al. ......... 711/113 |
| 7,127,549 | B2 * | 10/2006 | Sinclair ................ 711/100 |
| 2004/0064607 | A1 | 4/2004 | Odakura et al. ......... 710/57 |

OTHER PUBLICATIONS

"Improved Disk Drive Power Consumption Using Solid State Non-Volatile Memory", C. Nicholson. Slide Presention. May 5, 2004.
"Microsoft Proposes Combining Flash, Hard Drives", M. Hachman. ExtremeTech website article http://www.extremetech.com/article2/0,1558,1585978,00.asp. May 6, 2004.

* cited by examiner

*Primary Examiner*—Jack Lane
(74) *Attorney, Agent, or Firm*—John L. Rogitz

(57) ABSTRACT

For non-bursty data writes, data is written to flash memory of a hard disk drive for subsequent de-staging to disk, whereas for bursty writes data is written directly to disk.

19 Claims, 2 Drawing Sheets

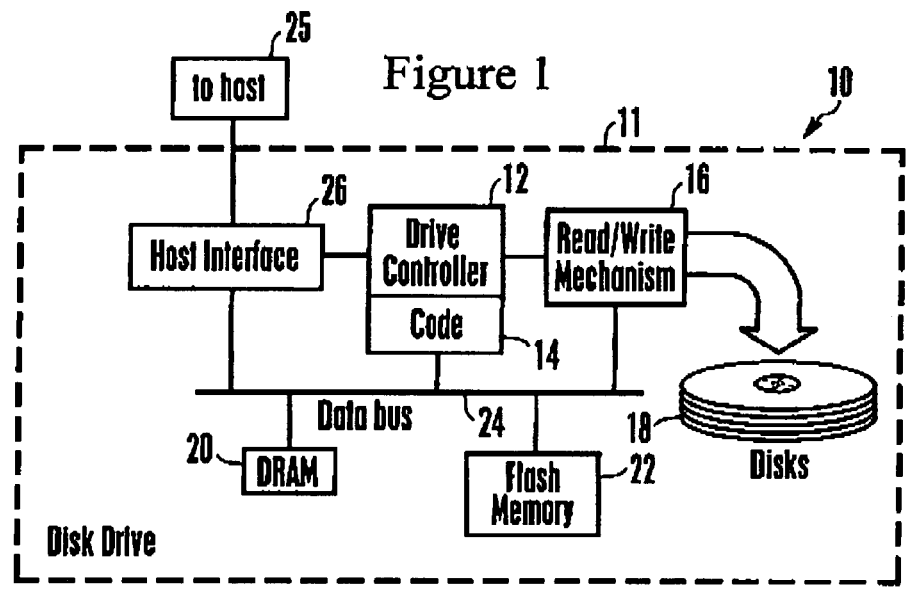
Figure 1
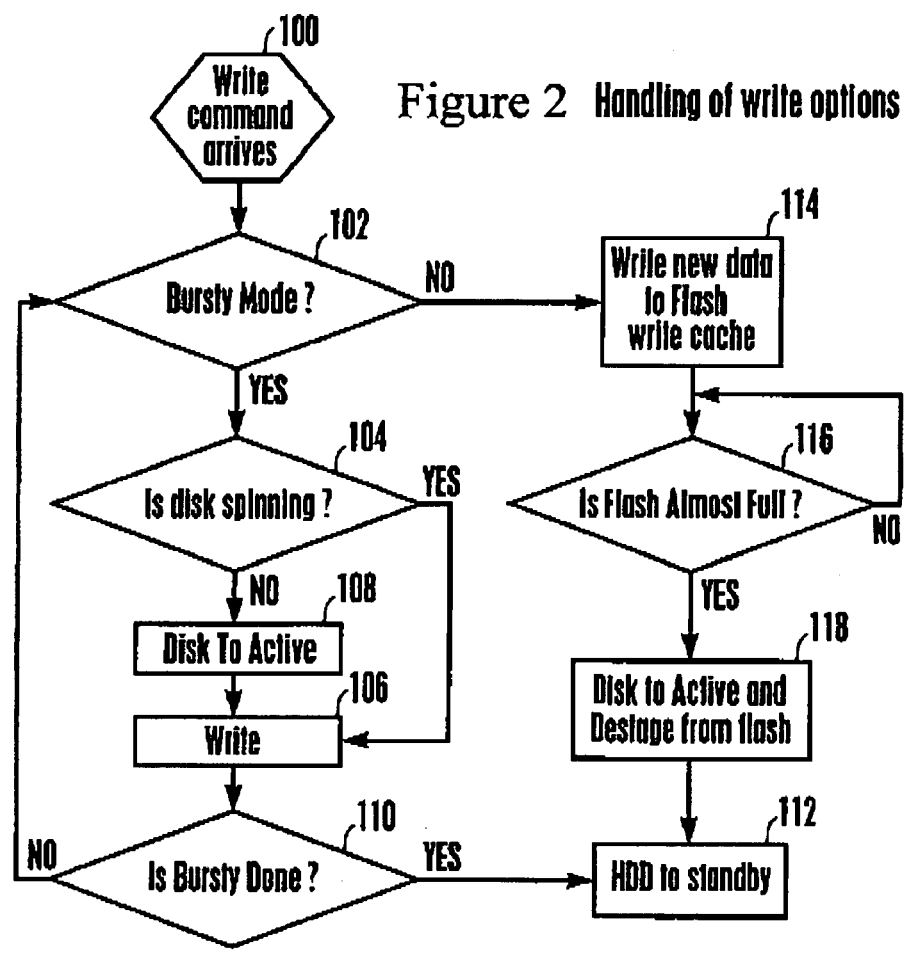
Figure 2  Handling of write options

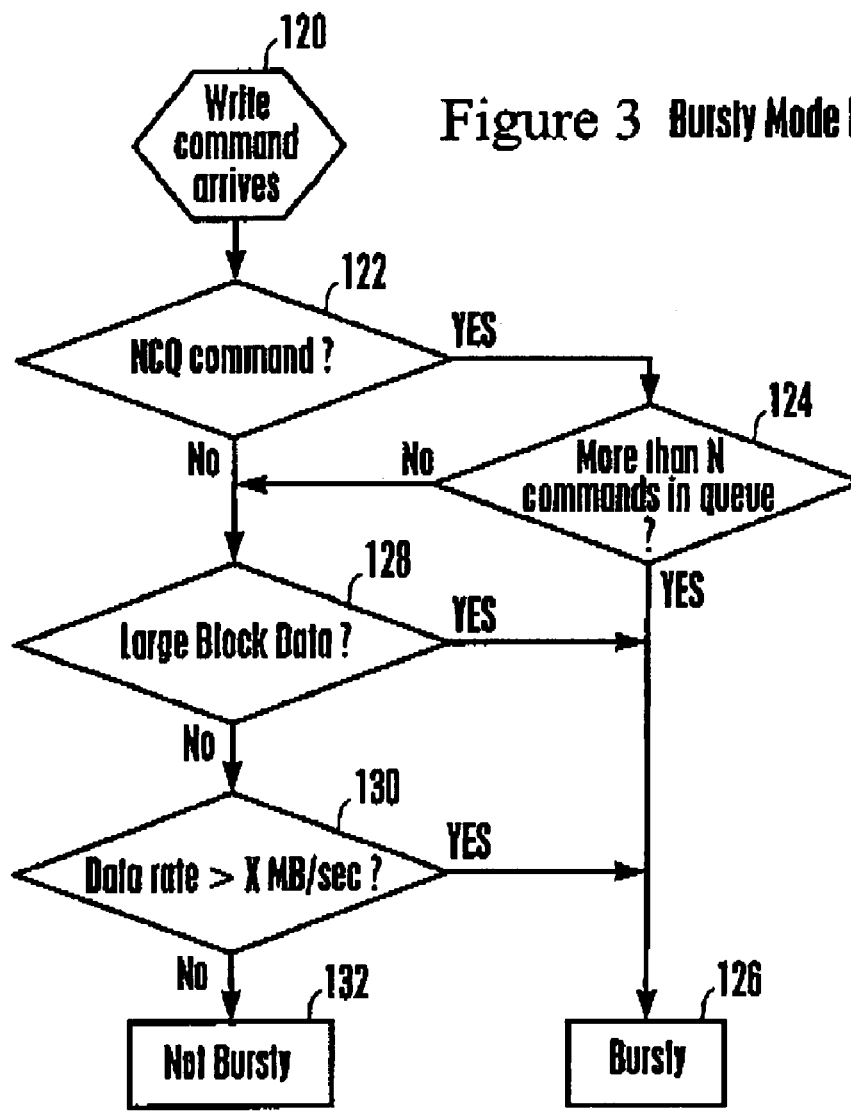
Figure 3 Bursty Mode Detection

SYSTEM AND METHOD FOR SELECTIVE WRITE TO FLASH MEMORY IN HDD

FIELD OF THE INVENTION

The present invention relates generally to hard disk drives (HDD).

BACKGROUND OF THE INVENTION

As recognized in the present assignee's co-pending U.S. patent application Ser. No. 10/963,190, hard disk drives (HDD) typically include both disk memory and solid state memory referred to as "cache" for temporarily holding data being transferred between the disks and a host computer. Conventionally, the cache is Dynamic Random Access Memory (DRAM), a volatile form of memory that can undergo a significant number of write/erase cycles and that has a very high data transfer rate to and from the disks.

With the advent of mobile computers that are battery powered, some HDDs have been provided wherein the disks spin down (stop rotating) when inactive for a period of time. The main purpose of this is to extend the battery life of the computer. When a disk drive is spun down to a standby mode with just the electronics active, battery power is conserved. As recognized herein, however, when data must be written to the disks, the disks must spin up to enable the write to take place, which consumes a significant amount of battery power. If this occurs frequently, no power saving can be attained.

Accordingly, the present invention understands that one solution is to cache the write data to DRAM, and then destage the cached data to disk at some later time. As further understood herein, because DRAM is volatile memory, the data in the DRAM unfortunately can be lost if the HDD loses power before cached data is destaged to the disks.

Accordingly, it has been proposed to supplement the DRAM memory with non-volatile flash memory in mobile disk drives. Because flash memory is non-volatile, data that is stored in the flash memory will not be lost if power is lost.

As critically recognized herein, however, the data transfer rate of a flash memory is much slower than that of the disk. Specifically, typical data transfer rates of less expensive flash memory can be as slow as 2 MB/s, while data transfer rates directly to the disk (even a comparatively slower one such as might be used in a laptop computer) may exceed 50-100 MB/s. As a consequence, disk drive performance is greatly reduced when using flash memory, particularly when data is written to the HDD in bursts. A second drawback is that flash memory has a limited number of write cycles. With these critical recognitions in mind, the invention herein is provided.

SUMMARY OF THE INVENTION

A controller for a hard disk drive having at least one flash memory and at least one disk executes logic that includes determining whether a host computer is writing data in a burst mode. If it is, the data is written directly to the disk, bypassing the flash memory. Otherwise, the data is written to the flash memory prior to writing the data to disk.

Various ways to determine whether the write is a bursty write are disclosed herein. For example, the burst mode can be indicated if a threshold number of write commands in a command queue is satisfied. Or, the burst mode can be indicated if a threshold number of sequential commands each of a size satisfying a largeness threshold are received from the host computer. Yet again, the burst mode can be indicated if a number of write commands per second or data amount per second satisfies a threshold. The disk can remain in an inactive status in the absence of writes satisfying the burst mode until such time as the flash memory meets a fullness threshold.

In another aspect, a data storage device includes at least one storage disk, at least one solid state memory device, and means for preferentially writing bursty writes directly to disk, bypassing the solid state memory device, and preferentially writing non-bursty writes directly to the solid state memory device for subsequent destaging to disk.

In yet another aspect, a method for storing data on a hard disk drive (HDD) includes, when a disk of the HDD is inactive and a bursty write arrives, activating the disk and writing the bursty write to the disk without first writing the bursty write to a solid state memory of the HDD. Regardless of whether the disk of the HDD is inactive, however, if a non-bursty write arrives, the method writes the non-bursty write to the solid state memory of the HDD.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of a non-limiting HDD implementation of the present invention;

FIG. 2 is a flow chart of the logic for determining whether to write to flash memory or to disk directly; and FIG. 3 is a flow chart of the logic for determining whether a write is "bursty".

DETAILED DESCRIPTION OF THE PREFERRED EMBODIMENT

Referring initially to FIG. 1, a hard disk drive (HDD) is shown, generally designated 10, having a housing 11 holding a hard disk drive controller 12 that can include and/or be implemented by a microcontroller. The controller 12 may access electronic data storage in a computer program device or product such as but not limited to a microcode storage 14 that may be implemented by a solid state memory device. The microcode storage 14 can store microcode embodying the logic discussed further below.

The HDD controller 12 controls a read/write mechanism 16 that includes one or more heads for writing data onto one or more disks 18. Non-limiting implementations of the HDD 10 include plural heads and plural disks 18, and each head is associated with a respective read element for, among other things, reading data on the disks 18 and a respective write element for writing data onto the disks 18.

The HDD controller 12 communicates with solid state memory. One such solid state memory may be volatile memory such as a Dynamic Random Access Memory (DRAM) device 20. Also, the controller 12 may communicate with solid state non-volatile memory, preferably a flash memory device 22, over an internal HDD bus 24. The HDD controller 12 also communicates with an external host computer 25 through a host interface module 26 in accordance with HDD principles known in the art. The host computer 25 can be a portable computer that can be powered by a battery, so that the HDD 10 can be a mobile HDD.

As stated above, the logic disclosed below may be contained in a code storage 14 that is separate from the HDD controller 12, or the storage 14 may be integrated into the controller 12. Or, it may be contained in the read/write mechanism 16, or on the DRAM 20 or flash memory device 22. The logic may be distributed through the components mentioned above, and may be implemented in hardware logic circuits and/or software logic circuits.

The present invention critically recognizes that typical host disk read and write operations are bursty, and the typical media data rate is about 50 MB/sec for mobile HDD, 70 MB/s for desktop HDD and approaching 100 MB/s for server HDD. The present invention further critically recognizes that non-volatile flash memory is typically too slow for the sustainable bursty disk read and write operations, and that this mismatch of sustainable disk read/write operation speed and the flash write speed can be use as an indicator for how to handle writes. Specifically, as set forth further below in greater detail, when, for example, the host read/write data is faster than the typical 2-10 MB/sec flash write and 40 MB/sec flash read speed, this implies that the host is actively either reading data files from or writing data files to the HDD, in turn providing an indication that the HDD should bypass the flash memory and perform the host prescribed read/write operations directly with the disk media. This may require spinning up the disk if it is in the spun down "standby" mode.

Accordingly, now referring to FIG. 2, the logic of the present invention can be seen. Commencing at block 100, a write command arrives from the host computer 25 to the HDD 10. The type of write, i.e., bursty or not, is determined at decision diamond 102. If the write is bursty, the logic decides if the disks of the HDD are active, i.e., spinning and ready to receive data, at decision diamond 104. If the disk is found to be active, the data is written to the HDD at block 106. However, if the disk is not active (not spinning), the disk moves into an active state (spins up) at block 108 and then is written to at block 106.

Once the write is complete, at decision diamond 110 the logic determines whether the bursty write is over. If it is, the HDD disks are configured to standby mode at block 112, but if the write continues, the process loops back to decision diamond 102.

If it is decided that the write is not bursty at decision diamond 102, the new data is written to the flash memory 22 at block 114. This will occur with intermittent determinations of whether the flash memory 22 is almost full as indicated by the data content of the flash satisfying a fullness threshold, indicated at decision diamond 116. In the event that the amount of data in the flash memory 22 has not approached the capacity of the flash memory 22, the logic moves to a standby state at block 112, but otherwise the disks of the HDD are activated (spun up) at block 118 and the data in the flash memory 22 is destaged to disk. Then, assuming the write has been completed, the disks are configured to the standby mode at block 112.

Now referring to FIG. 3, various ways to determine whether a write is "bursty" are shown, it being understood that while for convenience the various methods are shown in flow chart format in a single logic flow chart, only one of the methods need be implemented in practice.

Beginning with block 120, a write command arrives from the host computer 25. The question of the write being a queuing command such as, e.g., a native command queuing (NCQ) command is asked at decision diamond 122. If yes, the logic then determines whether there are more commands in the queue than a threshold number of commands at decision diamond 124. If there are more commands in the queue than the threshold number, the write is considered bursty and indicated as such at block 126.

Another way to determine whether the write is "bursty" is shown at decision diamond 128, wherein it is determined whether each of a sequence of received data blocks to be written is large as might be indicated by, e.g., a data block size exceeding a threshold. If affirmative, the write is considered bursty at block 126.

Yet another way to determine whether the write is "bursty" is shown at decision diamond 130, wherein it is determined whether the data rate of the write is greater than a threshold rate, e.g., a threshold number of megabytes per second or a threshold number of individual write commands per second. If the actual data rate is greater than the threshold, the write is considered bursty at block 126. If no "bursty" test is positive, the data write is returned as not bursty at block 132.

With the above disclosure in mind, the present invention provides both power saving and maintains good performance. Also, by writing directly to disk under the right condition instead of always writing to flash first, the limited write cycles of flash memory is conserved, thus extending the life of the flash and optimizing use of the flash memory.

While the particular SYSTEM AND METHOD FOR SELECTIVE WRITE TO FLASH MEMORY IN HDD as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A controller for a hard disk drive having at least one flash memory and at least one disk, comprising logic executing method acts including:
   determining whether a host computer is writing data in a burst mode; and
   writing the data directly to the disk, bypassing the flash memory, when the writing of data is in the burst mode, and otherwise writing the data to the flash memory prior to writing the data to disk, wherein the burst mode is indicated if one or more of the following conditions is met; a threshold number of write commands in a command queue is satisfied, a threshold number of sequential commands each of a size satisfying a largeness threshold are received from the host computer, a number of write commands per second satisfies a threshold, number of bytes received per second satisfies a threshold.

2. The controller of claim 1, wherein the burst mode is indicated if a threshold number of write commands in a command queue is satisfied.

3. The controller of claim 1, wherein the burst mode is indicated if a threshold number of sequential commands each of a size satisfying a largeness threshold are received from the host computer.

4. The controller of claim 1, wherein the burst mode is indicated if a number of write commands per second satisfies a threshold.

5. The controller of claim 1, wherein burst mode is indicated if a number of bytes received per second satisfies a threshold.

6. The controller of claim 1, wherein the disk remains in an inactive status in the absence of writes satisfying the burst mode until such time as the flash memory meets a fullness threshold.

7. A data storage device comprising:
 at least one storage disk;
 at least one solid state memory device; and
 means for preferentially writing bursty writes directly to disk, bypassing the solid state memory device, and preferentially writing non-bursty writes directly to the solid state memory device for subsequent destaging to disk, wherein the means for preferentially writing writes to disk, bypassing solid state memory, if one or more of the following conditions are met; a threshold number of write commands in a command queue is satisfied, a threshold number of sequential commands each of a size satisfying a largeness threshold are received from a host computer, a number of write commands per second satisfies a threshold, a number of bytes received per second satisfies a threshold.

8. The device of claim 7, wherein the means for preferentially writing writes to disk, bypassing solid state memory, if a threshold number of write commands in a command queue is satisfied.

9. The device of claim 7, wherein the means for preferentially writing writes to disk, bypassing solid state memory, if a threshold number of sequential commands each of a size satisfying a largeness threshold are received from a host computer.

10. The device of claim 7, wherein the means for preferentially writing writes to disk, bypassing solid state memory, if a number of write commands per second satisfies a threshold.

11. The device of claim 7, wherein the means for preferentially writing writes to disk, bypassing solid state memory, if a number of bytes received per second satisfies a threshold.

12. The device of claim 7, wherein the disk remains in an inactive status in the absence of writes satisfying the burst mode until such time as the solid state memory meets a fullness threshold.

13. The device of claim 7, wherein the solid state memory is a flash memory.

14. A method for storing data on a hard disk drive (HDD), comprising:
 when a disk of the HDD is inactive and a bursty write arrives, activating the disk and writing the bursty write to the disk without first writing the bursty write to a flash memory of the HDD; and
 regardless of whether the disk of the HDD is inactive, if a non-bursty write arrives, writing the non-bursty write to the flash memory of the HDD.

15. The method of claim 14, wherein the burst mode is indicated if a threshold number of write commands in a command queue is satisfied.

16. The method of claim 14, wherein the burst mode is indicated if a threshold number of sequential commands each of a size satisfying a largeness threshold are received from a host computer.

17. The method of claim 14, wherein the burst mode is indicated if a number of write commands per second satisfies a threshold.

18. The method of claim 14, wherein burst mode is indicated if a number of bytes received per second satisfies a threshold.

19. The method of claim 14, wherein the disk remains in an inactive status in the absence of writes satisfying the burst mode until such time as the flash memory meets a fullness threshold.

* * * * *